United States Patent
Takeuchi (10) Patent No.: US 10,200,558 B2
(45) Date of Patent: Feb. 5, 2019

(54) IMAGE READING APPARATUS, IMAGE READING METHOD, AND STORAGE MEDIUM

(71) Applicant: CANON KABUSHIKI KAISHA, Tokyo (JP)

(72) Inventor: Noriko Takeuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/601,490

(22) Filed: May 22, 2017

(65) Prior Publication Data

US 2017/0359476 A1    Dec. 14, 2017

(30) Foreign Application Priority Data

Jun. 9, 2016 (JP) .................. 2016-115482

(51) Int. Cl.
*H04N 1/10* (2006.01)
*H04N 1/00* (2006.01)
*H04N 1/047* (2006.01)

(52) U.S. Cl.
CPC ........... *H04N 1/10* (2013.01); *H04N 1/00013* (2013.01); *H04N 1/00408* (2013.01); *H04N 1/00474* (2013.01); *H04N 1/00819* (2013.01); *H04N 1/0473* (2013.01); *H04N 2201/0081* (2013.01)

(58) Field of Classification Search
CPC .... H04N 1/10; H04N 1/00474; H04N 1/0473; H04N 1/00408; H04N 1/00013; H04N 1/00819; H04N 2201/0081
See application file for complete search history.

(56) References Cited

U.S. PATENT DOCUMENTS

2005/0237402 A1* 10/2005 Sase ................ H04N 5/3575
                                                            348/257
2011/0075229 A1*  3/2011 Fujiwara .......... H04N 1/00002
                                                            358/488
2018/0069976 A1*  3/2018 Yamada .......... H04N 1/00753

FOREIGN PATENT DOCUMENTS

JP           2009-135730 A    6/2009

* cited by examiner

*Primary Examiner* — Helen Zong
(74) *Attorney, Agent, or Firm* — Venable LLC (57) ABSTRACT

An object of the present invention is to detect the home position with a high accuracy without being affected by temperature. The present invention is an image reading apparatus having a reading portion, and the apparatus includes: an acquisition unit configured to acquire first data obtained by the reading portion reading a main scanning line in a state where a light source of the reading portion is turned on in a first light quantity, and second data obtained by the reading portion reading the main scanning line in a state where the light source of the reading portion is turned on in a second light quantity smaller than the first light quantity; a generation unit configured to generate difference data by subtracting the value of the second data from the value of the first data; and a determination unit configured to determine whether a mark arranged at a position corresponding to a home position of the reading portion has been detected on the main scanning line based on the difference data.

11 Claims, 7 Drawing Sheets

IMAGE READING APPARATUS, IMAGE READING METHOD, AND STORAGE MEDIUM

BACKGROUND OF THE INVENTION

Field of the Invention

The present invention relates to a technique to detect the home position of a sensor of an image reading apparatus with a high accuracy.

Description of the Related Art

In the field of the image reading apparatus, such as a scanner, the technique to detect the home position of a sensor with a high accuracy is demanded. In Japanese Patent Laid-Open No. 2009-135730, the home position is detected by taking into consideration the offset voltage for each chip making up an image sensor. Specifically, the offset value for each chip is measured and saved in a nonvolatile RAM. At the time of detecting the home position, the offset value of each sensor chip saved in the nonvolatile RAM is added to the value of the acquired read data.

SUMMARY OF THE INVENTION

In the case where the temperature of an environment in which the image reading apparatus is installed changes, the offset voltage fluctuates. The fluctuations in the output resulting mainly from the fluctuations in the offset voltage due to the change in temperature are called a temperature drift. Japanese Patent Laid-Open No. 2009-135730 does not take into consideration the fluctuations in the offset voltage due to the change in temperature and there is such a problem that it is not possible to correctly detect the home position depending on the environment in which the image reading apparatus is installed.

Consequently, an object of the present invention is to provide an image reading apparatus capable of detecting the home position of a sensor with a high accuracy without being affected by the temperature of the environment in which the image reading apparatus is installed.

The present invention is an image reading apparatus having a reading portion, and the image forming apparatus includes: an acquisition unit configured to acquire first data obtained by the reading portion reading a main scanning line in a state where alight source of the reading portion is turned on in a first light quantity, and second data obtained by the reading portion reading the main scanning line in a state where the light source of the reading portion is turned on in a second light quantity smaller than the first light quantity or in a state where the light source of the reading portion is turned off; a generation unit configured to generate difference data including pixel values corresponding to main scanning positions by subtracting the value of the second data from the value of the first data; and a determination unit configured to determine whether a mark arranged at a position corresponding to a home position of the reading portion has been detected on the main scanning line based on the difference data.

Further features of the present invention will become apparent from the following description of exemplary embodiments with reference to the attached drawings.

DESCRIPTION OF THE EMBODIMENTS

In the following, with reference to the drawings, preferred embodiments of the present invention are explained as examples. However, the relative arrangement of the components, the shapes of apparatuses, devices and the like described in the following are merely exemplary and are not intended to limit the scope of the present invention only to those. It should be understood that those obtained by appropriately modifying and improving the embodiments described below based on the common knowledge of a person in the art within the scope not deviating from its gist also fall within the scope of the present invention.

First Embodiment

<About Configuration of Image Reading Apparatus>

Figure 1:
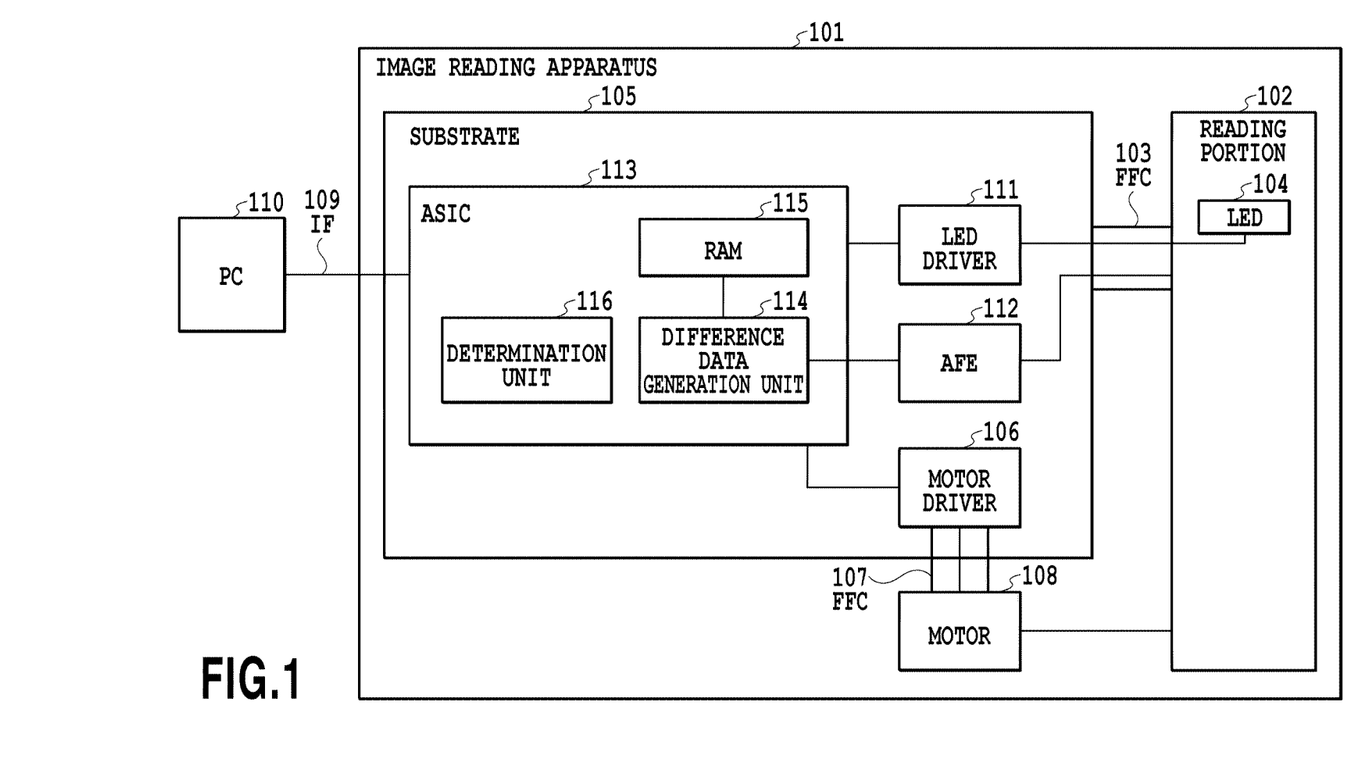
FIG. 1 is a block diagram showing a configuration of an image reading apparatus in a first embodiment.

FIG. 1 is a block diagram showing a configuration of an image reading apparatus 101 in a first embodiment. The image reading apparatus 101 includes a reading portion 102, a substrate 105 having an ASIC 113, and a motor 108. The image reading apparatus 101 is connected with a personal computer (hereinafter, PC) 110 by an interface (hereinafter, IF) 109, such as a USB and a wireless LAN. In the PC 110, a driver of the image reading apparatus 101 is installed and the PC 110 receives instructions from a user and notifies the image reading apparatus 101 of print data and reading instructions via the IF 109. The image reading apparatus 101 may be a single function apparatus including only the reading function or a multi-function apparatus including a plurality of functions, such as the printing function, in addition to the reading function. In the case where a multi-function apparatus is supposed, a print control unit configured to print an image on a sheet is added to the block diagram in FIG. 1.

The reading portion 102 is a portion configured to read a document set on a document table of the image reading apparatus 101. The reading portion 102 has an LED 104 and a sensor (not shown schematically). As the sensor, a contact image sensor (CIS), a reduction optical system sensor and the like may be used, but in the present embodiment, it is assumed that the CIS is used. The LED 104 is a light source to irradiate a document or the like set on the document table of the image reading apparatus 101 with light. The CIS converts the acquired intensity of light into an electric signal and outputs the electric signal to an analog front end (hereinafter, AFE) 112 of the substrate 105 via a flexible flat cable (hereinafter, FFC) 103.

The motor 108 is a unit configured to move the CIS of the reading portion 102 in a sub scanning direction. The motor 108 and a motor driver 106 of the substrate 105 are connected by an FFC 107 and the motor 108 is driven under the control of the motor driver 106. The drive force of the motor 108 is transmitted to the reading portion 102 via a gear (not shown schematically) or the like and moves the CIS of the reading portion 102 along the sub scanning direction.

In the following, the substrate 105 is explained. The substrate 105 includes the motor driver 106, an LED driver 111, the AFE 112, and the ASIC 113. As described above, the motor driver 106 controls the drive of the motor 108. The LED driver 111 controls ON/OFF of the LED 104 and causes the LED 104 to turn on or to turn off. Alternatively, it may also be possible for the LED driver 111 to control the LED 104 to turn on in a light quantity corresponding to a value within a predetermined range. The AFE 112 is a circuit configured to adjust a signal output from the CIS of the reading portion 102 and generally made up of an amplifier, a filer, and a semiconductor chip, such as an AD converter. The AFE 112 converts a signal (analog signal) output from the CIS of the reading portion 102 into a digital signal and transmits the converted signal to a difference data generation unit 114 of the ASIC 113. Although not shown schematically, the substrate 105 includes a CPU and a ROM and implements the difference data generation unit 114 and a determination unit 116, to be described later, by the CPU developing programs stored in the ROM onto a RAM 115 and executing the programs. Further, a flowchart, to be described later, is performed by the CPU developing the programs stored in the ROM onto the RAM 115 and executing the programs.

The ASIC 113 includes the difference data generation unit 114, the RAM 115, and the determination unit 116. The difference data generation unit 114 generates difference data to be used for home position detection. In the following, the generation of difference data is explained. The difference data generation unit 114 acquires data including pixel values corresponding to one main scanning line obtained by the CIS reading the one main scanning line in the reading portion 102 in which the LED 104 is turned on (hereinafter, on-time read data). The on-time read data is temporarily stored in the RAM 115. Next, the difference data generation unit 114 acquires data including pixel values corresponding to one main scanning line obtained by the CIS reading the same line as the one main scanning line in the reading portion 102 in which the LED 104 is turned off (hereinafter, off-time read data). Next, the difference data generation unit 114 generates difference data by subtracting the pixel value of the off-time read data from the pixel value of the on-time read data in each pixel.

The determination unit 116 determines whether a pixel is a black pixel or a white pixel by determining the relationship in magnitude between the pixel value of the pixel corresponding to a predetermined position and a predetermined threshold value for the difference data generated by the difference data generation unit 114. Next, the determination unit 116 determines whether the CIS of the reading portion 102 has detected the home position based on the results of the determination (details of the determination unit 116 will be described later).

<About Configuration of Reading Portion>

Figure 2:
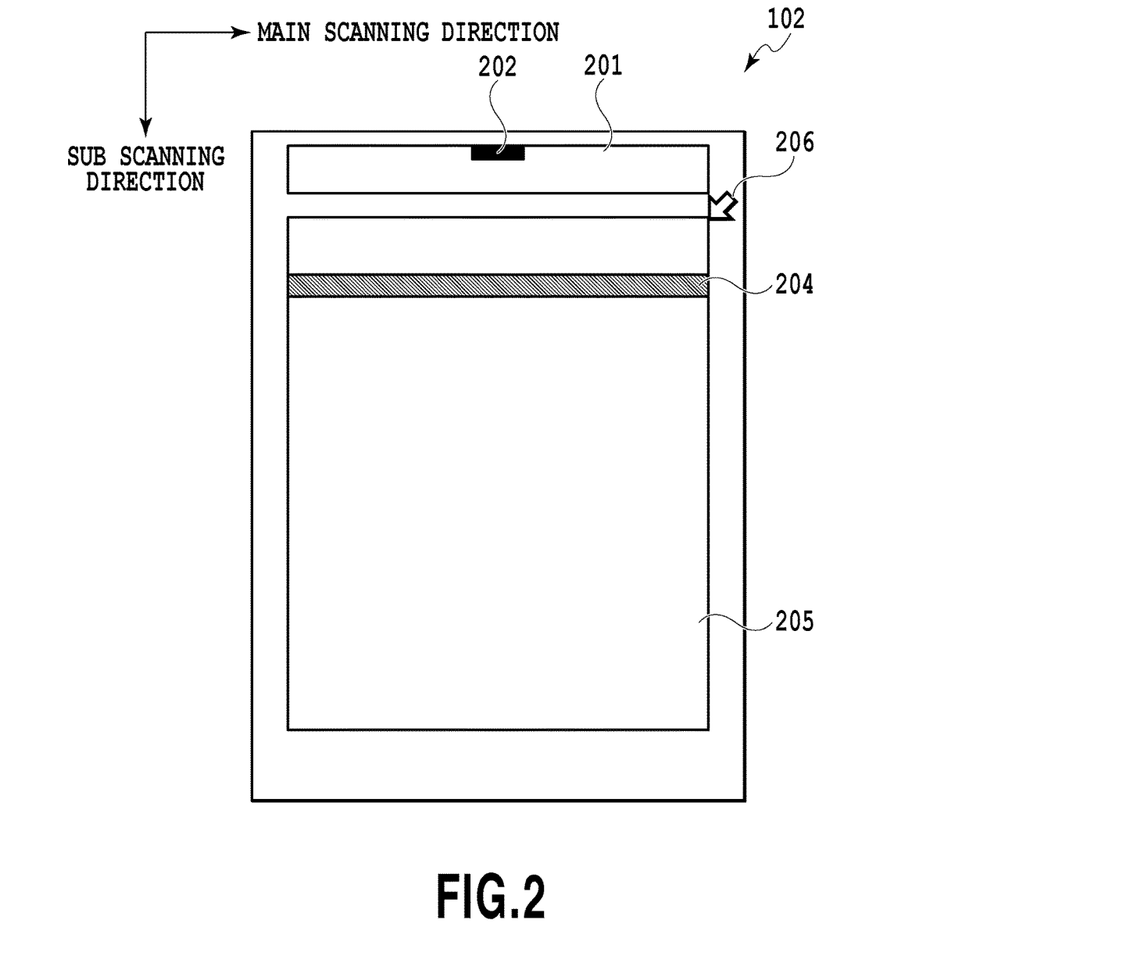
FIG. 2 is a diagram showing a configuration of a reading portion in the first embodiment.

FIG. 2 is a diagram showing the configuration of the reading portion 102 in the first embodiment and is a top diagram in the case where the reading portion 102 is viewed from above. The reading portion 102 includes a CIS 204 to read a document, a document table 205 made of glass to set a document, and a pressing unit (not shown schematically) to press a document. The document table 205 has an area large enough to read a document. A corner indicated by an arrow 206 in FIG. 2 is a reference corner in the case where a user sets a document and a user sets a document by pressing the document against this corner. Further, the reading portion 102 includes a mark sheet 201 outside the document reading range. As shown schematically, the mark sheet 201 has a black mark 202 at the center of the scanning position in the main scanning direction. The home position of the CIS 204 is determined with the position of the black mark 202 as a reference. The mark sheet 201 in FIG. 2 is shown in the state of being reversed for explanation, but in actuality, the mark sheet 201 is glued to the main body by a both-side tape or the like in the state of being reversed from the state in FIG. 2 and is made up so that the CIS 204 can read the black mark 202. Further, the mark of the mark sheet 201 is not limited to the black mark and another mark that can be detected by the CIS 204 may be used.

In the case where the image reading apparatus 101 ends normally, the CIS 204 stands by at the position near the black mark 202, i.e., at the home position, but there is a case where the image reading apparatus 101 does not end normally and the CIS 204 does not stand by at the home position (e.g., the case in FIG. 2). In the case where the CIS 204 does not stand by at the home position, at the time of power on of the image reading apparatus 101, the CIS 204 moves in the direction toward the black mark 202 (in the direction opposite to the sub scanning direction) until the CIS 204 detects the black mark 202. Due to this, it is possible for the CIS 204 to reach the home position.

<About Home Position Detection Operation>

Figure 3:
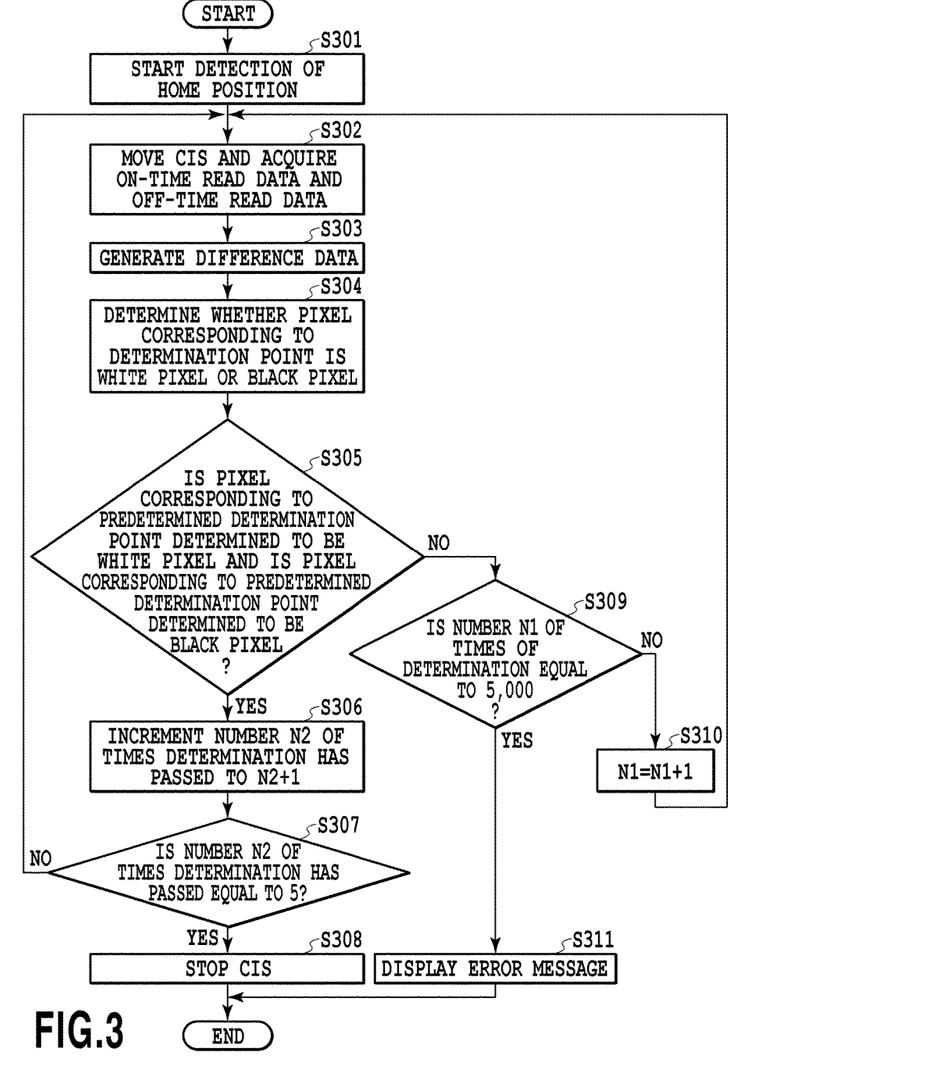
FIG. 3 is a flowchart of the operation in relation to home position detection in the first embodiment.

FIG. 3 is a flowchart of the operation in relation to the home position detection in the first embodiment.

In the case where the power source of the image reading apparatus 101 is turned on, the initialization operation of the IC, the motor and the like on the main substrate is performed. Next, at step S301, the CPU starts the detection of the home position of the CIS 204. As described above, the detection of the home position is performed by the CIS 204 detecting the black mark 202 of the mark sheet 201.

At step S302, the CIS 204 having moved one line in the direction opposite to the sub scanning direction reads one main scanning line in the state where the LED 104 of the reading portion 102 is turned on (on-time data). Next, the CIS 204 reads the one scanning line in the state where the LED 104 is turned off (off-time data). The on-time data and the off-time data read by the CIS 204 are sent to the difference data generation unit 114.

At step S303, the difference data generation unit 114 generates difference data based on the on-time read data and the off-time read data acquired at step S302. Specifically, the difference data generation unit 114 generates difference data by subtracting the pixel value of the off-time read data from the pixel value of the on-time read data in each pixel.

Figure 6A:
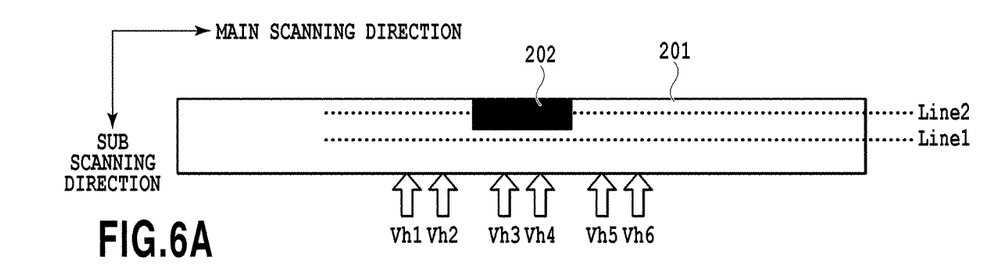
FIG. 6A and FIG. 6B are each a schematic diagram for explaining black mark detection in the first embodiment.

At step S304, the determination unit 116 determines whether each pixel corresponding to a predetermined position (hereinafter, a determination point) in the main scanning direction is a black pixel or a white pixel based on the relationship in magnitude between the pixel value and a threshold value. Here, in the present embodiment, it is assumed that as the determination points, six main scanning positions Vh1, Vh2, Vh3, Vh4, Vh5, and Vh6 are used (see FIG. 6A). As shown in FIG. 6A, the determination points Vh3 and Vh4 are set at the positions where the black mark exists on a certain main scanning line and the determination points Vh1, Vh2, Vh5, and Vh6 are set at the positions where the black mark does not exist. Because the determination point is used to detect the black mark, normally, it is desirable to set the determination point at the position where the black mark exists or in the vicinity of the black mark in the main scanning direction. Further, in the present embodiment, the six determination points are set, but the number of determination points is not limited to six. In the case where the number of determination points is large, the detection accuracy increases but the determination time lengthens, and on the other hand, in the case where the number of determination points is small, the determination time shortens but the detection accuracy decreases.

At step S305, the determination unit 116 determines whether the pixel corresponding to the predetermined determination point is determined to be a white pixel and the pixel corresponding to the predetermined determination point is determined to be a black pixel based on the results of the determination at step S304. Specifically, in the present embodiment, the determination unit 116 determines whether the pixels corresponding to the determination points Vh1, Vh2, Vh5, and Vh6 are determined to be a white pixel and the pixels corresponding to the determination points Vh3 and Vh4 are determined to be a black pixel. The reason this determination is performed is that, in the case where the pixels corresponding to the determination points Vh1, Vh2, Vh5, and Vh6 are determined to be a white pixel and the pixels corresponding to the determination points Vh3 and Vh4 are determined to be a black pixel, the possibility that the CIS 204 has detected the black mark 202 is strong. In the case where the results of the determination at step S305 are affirmative, the processing advances to step S306. On the other hand, in the case where the results of the determination are negative, the processing advances to step S309.

In the following, the case where the results of the determination at step S305 are affirmative is explained. At step S306, the CPU increments a number N2 of times the detection of the black mark 202 by the CIS 204 has succeeded (hereinafter, number of times determination has passed).

At step S307, the CPU determines whether N2=5. In the case where the results of the determination are affirmative, the processing advances to step 308. On the other hand, in the case where the results of the determination are negative, the processing returns to step S302. In the present embodiment, whether the number N2 of times determination has passed=5 is determined, but the value used for this determination is not limited to 5.

At step S308, the CPU causes the CIS 204 to stop at the detected home position and the home position detection operation is completed.

Next, the case where the results of the determination at step S305 are negative is explained. At step S309, the CPU determines whether a number N1 of times whether the black mark 202 is detected is determined (hereinafter, number of times of determination)=5,000. In the case where the results of the determination are affirmative, the processing advances to step S311. On the other hand, in the case where the results of the determination are negative, the processing advances to step S310. In the determination at step S309, whether the determination at step S305 is performed 5,000 times is determined. The reason this determination is performed is that the CIS 204 of the present embodiment can move across 5,000 lines at the maximum in the sub scanning direction and as described above in the explanation of step S302, the CIS 20 detects the black mark while advancing one line each time in the direction opposite to the sub scanning direction. In the present embodiment, whether the number N1 of times of determination=5,000 is determined, but in the case where the maximum number of lines across which the CIS can move is different, the value used at this step is of course different.

At step S310, the CPU increments the number N1 of times of determination and returns to step S302. At step S310, it may also be possible to reset the number N2 of times determination has passed to 0. At this time, only in the case where the detection of the black mark 202 at step S305 has succeeded five times in a row, it is determined that the detection of the home position has succeeded (YES at step S307).

At step S311, the CPU cannot detect the black mark 202 correctly, and therefore, determines that there is trouble in the CIS 204 or the motor 108. Then, the CPU displays an error message indicating this on the panel or the like of the image reading apparatus 101 and the home position detection operation is terminated. That is, the CPU performs display control processing of error information as the processing at step S311.

<About Signal Used for Home Position Detection>

Figure 4:
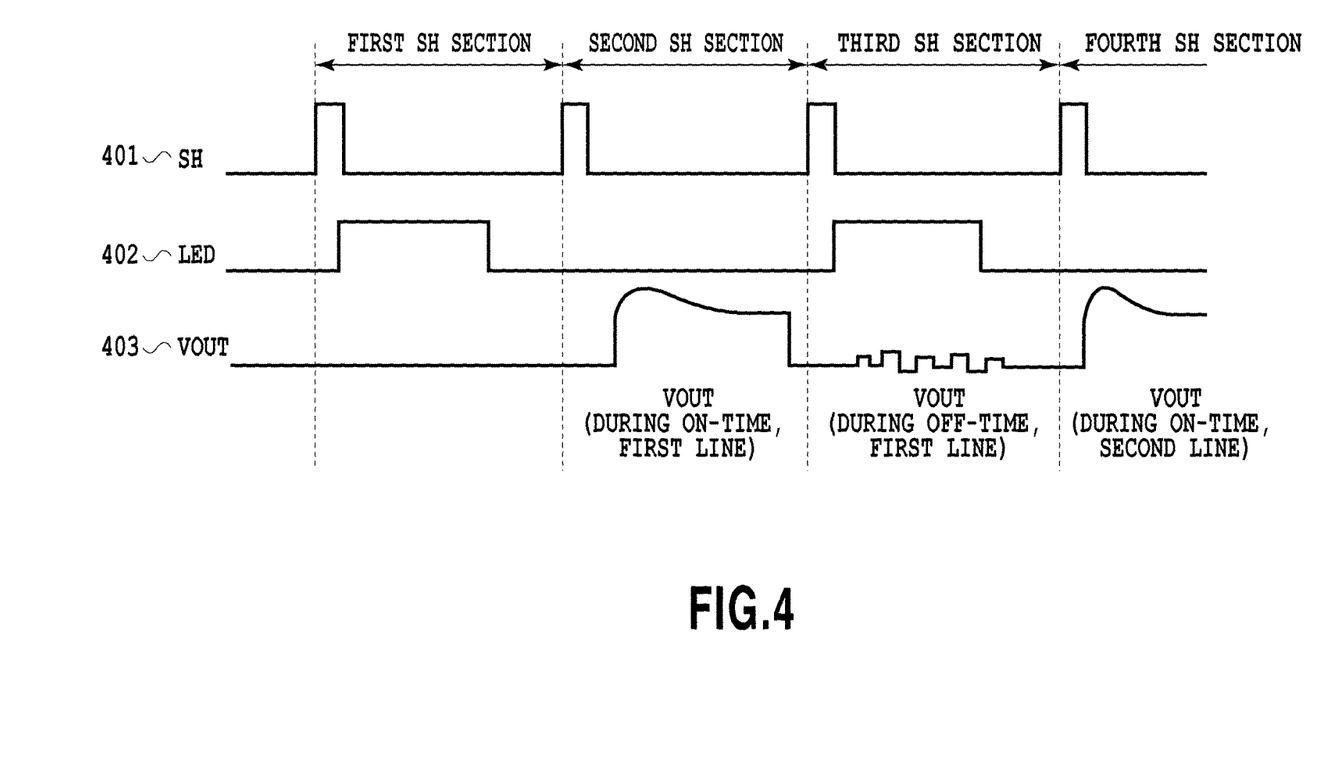
FIG. 4 is a timing chart of signals used for the home position detection.

FIG. 4 is a timing chart of signals used for the home position detection. Time elapses from left to right in FIG. 4. An SH signal 401 is a signal that is input to the CIS 204. As shown in FIG. 4, the intervals of the pulse wave of the SH signal are taken to be SH sections. Upon receipt of "High" of the SH signal 401, the CIS 204 reads one main scanning line and outputs a VOUT signal 403. The LED 104 repeatedly turns on and off for each pulse of the SH signal 401.

An LED signal 402 is a signal that is input to the LED 104. "High" of the LED signal 402 turns on the LED 104 and "Low" of the LED signal 402 does not turn on the LED 104. In the present embodiment, as shown in FIG. 4, the on-time data is output as the VOUT signal 403 in the SH section next to the SH section in which the LED 104 is turned on (e.g., VOUT (during on-time, first line) in FIG. 4). Further, the off-time data is output as the VOUT signal 403 in the SH section next to the SH section in which the LED 104 is turned off (e.g., VOUT (during off-time, first line) in FIG. 4). The difference data generation unit 114 generates difference data based on, for example, these two pieces of output data and the like. That is, as described above, the difference data generation unit 114 generates difference data by subtracting the pixel value of the off-time read data from the pixel value of the on-time read data in each pixel.

The difference data generated by the difference data generation unit 114 is used for the home position detection. The determination unit 116 determines whether a pixel is a black pixel (black pixel determination) by determining a relationship in magnitude between the pixel value of the pixel corresponding to a predetermined determination point and a predetermined threshold value for the difference data. Further, the determination unit 116 determines whether a pixel is a white pixel (white pixel determination) by determining a relationship in magnitude between the pixel value of the pixel corresponding to a predetermined determination point and a predetermined threshold value for the difference data. In the present specification, the threshold value used for the black pixel determination is called a black threshold value and the threshold value used for the white pixel determination is called a white threshold value. Next, the determination unit 116 determines whether the CIS 204 of the reading portion 102 has detected the home position (black mark) based on the results of the black pixel determination and the white pixel determination. Specifically, in the present embodiment, whether the pixels corresponding to the determination points Vh1, Vh2, Vh5 and Vh6 have been determined to be the white pixel and the pixels corresponding to the determination points Vh3 and Vh4 have been determined to be the black pixel is determined. In the present embodiment, the case where the determination at all the six determination points has succeeded is regarded as having passed the determination (YES at step S305→step S306). However, it may also be possible to regard the case where the percentage of success is about 80% (i.e., in the present embodiment, the case where the determination at the five determination points of the six determination points has succeeded) as having passed the determination. The off-time data in the present embodiment is output, as in the case of the on-time data, by taking into consideration the fluctuations in the offset voltage due to the change in temperature, in addition to the offset voltage (fixed value) for each chip of the CIS 204. Because of this, by generating the difference data by subtracting the pixel value of the off-time read data from the pixel value of the on-time read data in each pixel, it is possible to cancel out the increase in the pixel value corresponding to the fluctuations in the offset voltage due to the change in temperature. Consequently, by the present embodiment, it is made possible to detect the home position of the CIS 204 with a high accuracy irrespective of the temperature of the environment in which the image reading apparatus 101 is installed. It is not necessary to save the value of VOUT used for the home position detection, the value obtained by subtracting the pixel value of the off-time read data from the pixel value of the on-time read data, etc., in a nonvolatile memory and the like, but it is sufficient to temporarily save them in the RAM 115 and the like at the time of the home position detection.

In the present embodiment, the difference data is generated for one main scanning line each time by alternately turning on and off the LED 104 to acquire the on-time data and the off-time data, but the timing of turning on and off the LED 104 is not limited to this example. It may also be possible to acquire, after acquiring the on-time data by the CIS 204 reading a plurality of lines in the state where the LED 104 is turned on, the off-time data by the CIS 204 reading the plurality of lines in the state where the LED 104 is turned off, and then to generate the difference data corresponding to the plurality of lines based on the acquired on-time data and off-time data. Alternatively, it may also be possible to acquire the off-time data, after acquiring the on-time data by the CIS 204 reading all the lines in the state where the LED 104 is turned, by the CIS 204 reading all the lines in the state where the LED 104 is turned off.

Further, in the present embodiment, as the off-time data for generating the difference data, the data, which has been read by the CIS 204 in the state where the LED 104 is completely turned off, is used. However, the data that is used is not limited to the data acquired in the state where the LED 104 is completely turned off. It may also be possible to use another piece of data capable of cancelling out the offset voltage and the increase in the pixel value corresponding to the fluctuations in the offset voltage due to the change in temperature. That is, it may also be possible to use data acquired in the state where the LED 104 is turned on in a predetermined light quantity smaller than the light quantity at the time of the acquisition of the on-time data, for example, in a light quantity 1% of that at the time of the acquisition of the on-time data. This also applies to the on-time data and it may also be possible to use data acquired in the stage where the LED 104 is turned on in a light quantity 99% of that at the time of the acquisition of the on-time data.

<About Determination by Threshold Value in the Present Embodiment>

Figure 5:
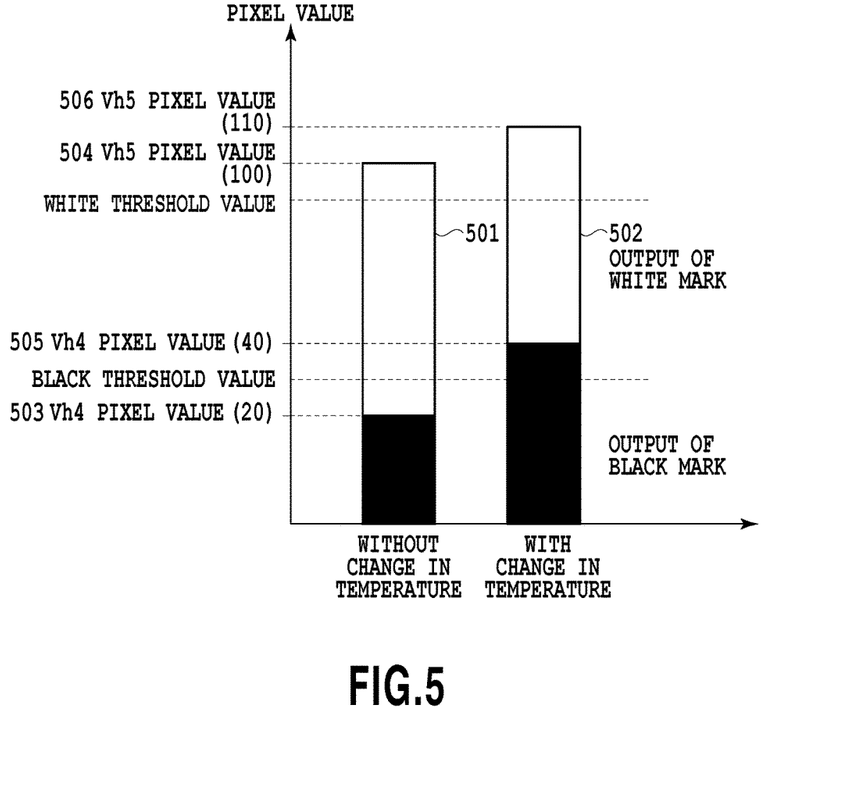
FIG. 5 is a schematic diagram for explaining determination by threshold values in the first embodiment.

In the following, the determination by the threshold value in the present embodiment is explained by using FIG. 5, FIG. 6A, and FIG. 6B. FIG. 5 is a schematic diagram for explaining the problem of the present embodiment, showing the way the value of VOUT fluctuates due to the change in temperature. In FIG. 5, symbol 501 schematically indicates the values (pixel values) of VOUT corresponding to the determination points Vh4 and Vh5 on the main scanning line Line 2 in the state where there is almost no change in temperature at the time of power on and the like of the image reading apparatus 101 (see FIG. 6A). Here, Vh4 is the determination point set at the position where the black mark exists on the main scanning line Line 2 and Vh5 is the determination point set at the position where the black mark does not exist (position of the white mark). Symbol 503 indicates the pixel value at the determination point Vh4 in the state where there is no change in temperature and the specific value is 20. Symbol 504 indicates the pixel value at the determination point Vh5 in the state where there is no change in temperature and the specific value is 100. In the present embodiment, for a specific pixel, the pixel is determined to be a black pixel in the case where the pixel value is smaller than or equal to a predetermined black threshold value and the pixel is determined to be a white pixel in the case where the pixel value is larger than or equal to a predetermined white threshold value. As indicated by symbol 501, in the case where there is no change in temperature, the pixel corresponding to the determination point Vh4 is determined correctly to be a black pixel and the pixel corresponding to the determination point Vh5 is determined correctly to be a white pixel.

On the other hand, symbol 502 in FIG. 5 schematically indicates the pixel values corresponding to the values of VOUT corresponding to the determination points Vh4 and Vh5 on the main scanning line Line 2 in the state where the temperature of the environment in which the image reading apparatus 101 is installed is high. Symbol 502 in FIG. 5 may be the value of VOUT in the state where the internal temperature of the CIS 204 has risen. Further, the pixel value in the present embodiment is a value obtained by converting a voltage value obtained by reading processing into a digital value. Symbol 505 indicates the pixel value at the determination point Vh4 in the state where there is a change in temperature and the specific value is 40. Symbol 506 indicates the pixel value at the determination point Vh5 in the state where there is a change in temperature and the specific value is 110. From the above, it is known that the pixel values at the determination points Vh4 and Vh5 have increased compared to those in the case where there is no change in temperature. This results from that the offset voltage increases in the case of the use in a high-temperature state, and therefore, a high voltage value is output compared to that in the state where there is no change in temperature. In the present application, by using the pixel value obtained by converting a voltage value, determination processing at step S305, to be described later, is performed, but it may also be possible to perform determination processing by using a voltage value. As described above, in the white pixel determination, whether the pixel value is larger than or equal to a predetermined white threshold value is determined, and therefore, the pixel corresponding to the determination point Vh5 can be determined correctly to be a white pixel, and therefore, no problem occurs in particular. However, in the black pixel determination, whether the pixel value is smaller than or equal to a predetermined black threshold value is determined, and therefore, in the case where the pixel value increases due to the change in temperature and exceeds the black threshold value, it is not possible to correctly determine that the pixel corresponding to the determination point Vh4 is a black pixel. Consequently, it is no longer possible to perform the home position detection correctly. In order to solve this problem, in the present embodiment, by generating the difference data by subtracting the pixel value of the off-time read data from the pixel value of the on-time read data in each pixel, the increase in the pixel value corresponding to the fluctuations in the offset voltage due to the change in temperature is cancelled out.

Figure 6B:
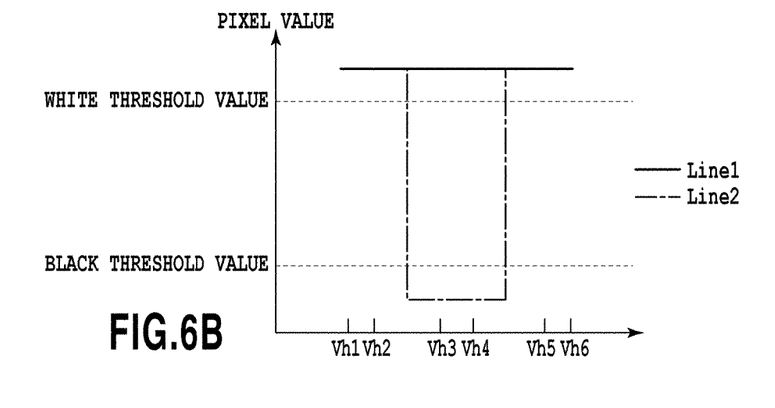

FIG. 6A and FIG. 6B are schematic diagrams for explaining the black mark detection in the present embodiment and FIG. 6A shows the mark sheet used in the present embodiment. As shown in FIG. 6A, the mark sheet 201 has the black mark 202 at the center of the scanning position in the main scanning direction. The determination points Vs3 and Vh4 are set at the positions where the black mark exists on the main scanning line Line 2 and the determination points Vh1, Vh2, Vh5, and Vh6 are set at the positions where the black mark does not exist on the main scanning line Line 2. In this manner, the determination point used for the black pixel determination is set at the position where the black mark exists on a certain main scanning line and the determination point used for the white pixel determination is set at the position where the black mark does not exist on all the main scanning lines. Further, it is necessary to set the determination point by taking into consideration the tolerance at the time of attaching the mark sheet 201 to the image reading apparatus 101. In the following, the case is explained where the detection of the black mark 202 is performed on the main scanning line Line 2 after the detection of the black mark 202 is performed on the main scanning line Line 1.

FIG. 6B is a graph representing a relationship between the main scanning position and the pixel value of the difference data used for the black pixel determination and the white pixel determination and the horizontal axis represents the main scanning position and the vertical axis represents the value obtained by subtracting the pixel value of the off-time read data from the pixel value of the on-time read data. As described above, in the present embodiment, for a specific pixel, whether the specific pixel is a black pixel is determined by determining the relationship in magnitude between the pixel value and the black threshold value, and whether the specific pixel is a white pixel is determined by determining the relationship in magnitude between the pixel value and the white threshold value. The black threshold value and the white threshold value are determined based on the specifications of the CIS 204 and the reflectance of the black mark 202 and the reflectance of the white mark of the mark sheet 201.

Upon the start of detection of the black mark 202, the CIS 204 moves one line each time in the direction opposite to the sub scanning direction. Then, upon reaching the main scanning line Line 1, the CIS 204 generates difference data for the main scanning line Line 1 by reading the main scanning line Line 1. This difference data is data including the pixel values of the pixels corresponding to the main scanning positions and generated by subtracting the pixel value of the off-time read data from the pixel value of the on-time read data in each pixel. On the main scanning line Line 1, the black mark 202 does not exist and only the white mark exists, and therefore, the pixel value of the difference data is a fixed value across the entire main scanning position and the fixed value is larger than the white threshold value as indicated by the solid line in FIG. 6B. Consequently, all the pixels corresponding to the six determination points Vh1 to Vh6 on the main scanning line Line 1 are determined to be a white pixel, and as a result, it is determined that the detection of the black mark 202 has failed on the main scanning line Line 1 (NO at step S305).

After the detection of the black mark 202 on the main scanning line Line 1 has failed, the CIS 204 moves one line in the direction opposite to the sub scanning direction and generates difference data for the main scanning line Line 2 by reading the main scanning line Line 2. This difference data is data including the pixel values of the pixels corresponding to the main scanning positions and generated by subtracting the pixel value of the off-time read data from the pixel value of the on-time read data in each pixel. On the main scanning line Line 2, the black mark 202 exists, and therefore, the pixel value of the difference data changes depending on the main scanning position as indicated by the one-dot chain line in FIG. 6B. That is, while the pixel values corresponding to the determination points Vh1, Vh2, Vh5, and Vh6 are larger than the white threshold value as on the main scanning line Line 1, the pixel values corresponding to the determination points Vh3 and Vh4 are smaller than the black threshold value. Consequently, the pixels corresponding to the determination points Vh1, Vh2, Vh5, and Vh6 on the main scanning line Line 2 are determined to be a white pixel and the pixels corresponding to the determination points Vh3 and Vh4 are determined to be a black pixel. As a result of this, it is determined that the detection of the black mark 202 has succeeded on the main scanning line Line 2 (YES at step S305).

As described above, in the present embodiment, the difference data is generated by subtracting the pixel value of the off-time read data from the pixel value of the on-time read data in each pixel. By this processing to subtract the pixel value of the off-time read data, even in the case where a high pixel value is output accompanying a rise in temperature, it is possible to cancel out the increase in the pixel value accompanying the rise in temperature. That is, it is possible to cancel out the increase in the offset voltage accompanying the rise in temperature. Consequently, it is made possible to detect the home position of the sensor with a high accuracy without being affected by the temperature of the environment in which the sensor is installed.

Second Embodiment

In the first embodiment, based on the on-time read data and the off-time read data, the difference data is generated. The on-time read data and the off-time read data are data acquired for the same main scanning line. However, it may also be possible to use another piece of data as the difference data. In the present embodiment, the difference data is generated based on the on-time read data and the off-time read data for a certain main scanning line. Then, the difference data is generated based on the on-time read data and the off-time read data for the next main scanning line. Then, based on the difference between both pieces of difference data, the difference data is generated. In the present embodiment, explanation of the contents in common to those of the first embodiment is omitted.

Figure 7A:
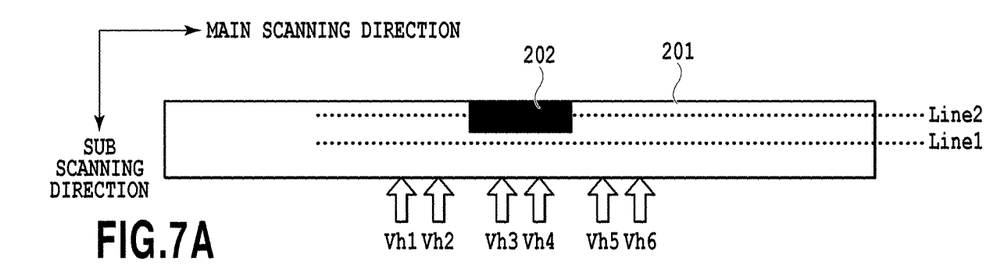
FIG. 7A and FIG. 7B are each a schematic diagram for explaining black mark detection in a second embodiment.
Figure 7B:
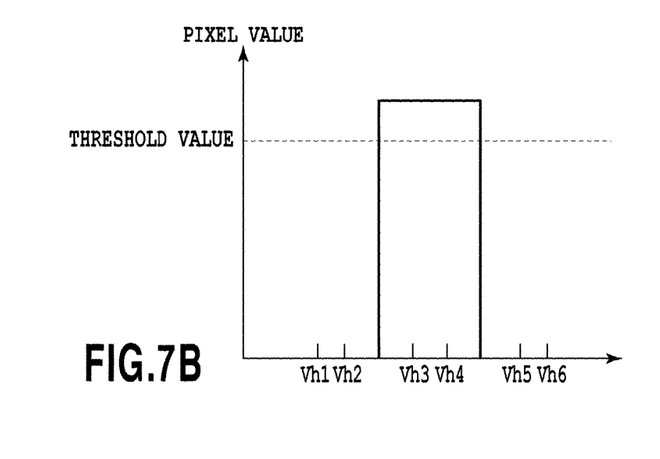

FIG. 7A and FIG. 7B are schematic diagrams for explaining the black mark detection in the present embodiment and FIG. 7A shows the mark sheet used in the present embodiment. As shown in FIG. 7A, the mark sheet used in the present embodiment is the same as that shown in FIG. 6A.

The difference data in the present embodiment is explained again. To begin with, first difference data is generated by subtracting the pixel value of the off-time read data from the pixel value of the on-time read data for a certain main scanning line. Further, second difference data is generated by subtracting the pixel value of the off-time read data from the pixel value of the on-time read data for the main scanning line that the CIS 204 reads next. Then, data including the value obtained by subtracting the pixel value of the second difference data from the pixel value of the first difference data in each pixel is taken to be difference data in the present embodiment. FIG. 7B is a graph representing a relationship between the pixel value of the difference data and the main scanning position, and the horizontal axis represents the main scanning position and the vertical axis represents the pixel value of the difference data.

In the first embodiment, the relationship in magnitude between the difference data and the pixel value is determined by using the two threshold values, i.e., the black threshold value and the white threshold value, but in the present embodiment, one threshold value is used. That is, in the case where the pixel values of the difference data corresponding to the predetermined determination points (in this example, the determination points Vh3 and Vh4) are larger than the threshold value, it is determined that the detection of the black mark 202 has succeeded.

In the following, detailed explanation is given. After the detection of the black mark 202 on the main scanning line Line 1 has failed, the CIS 204 moves one line in the direction opposite to the sub scanning direction and starts the detection of the black mark 202 on the main scanning line Line 2. Specifically, by reading the main scanning line Line 2, the difference data for the main scanning line Line 1 and the main scanning line Line 2 is generated. This difference data is data including the pixel values of the pixels corresponding to the main scanning positions. That is, this difference data is generated by subtracting the value of the difference data of the on-time and the off-time read data for the main scanning line Line 2 from the value of the difference data of the on-time and the off-time read data for the main scanning line Line 1 in each pixel. Based on the relationship in magnitude between the pixel values at the determination points of the difference data and the threshold value, whether the black mark 202 has been detected on the main scanning line Line 2 is determined.

At the position where the black mark 202 does not exist, the pixel value of the on-time read data for the main scanning line Line 1 and the pixel value of the on-time read data for the main scanning line Line 2 are equal. As a result, the pixel value of the difference data is zero at the determination points Vh1, Vh2, Vh5, and Vh6.

On the other hand, at the position where the black mark 202 exists, the pixel value of the on-time read data for the main scanning line Line 1 is higher than the pixel value of the on-time read data for the main scanning line Line 2. As a result, the pixel value of the difference data is higher than zero at the determination points Vh3 and Vh4.

As described above, in the present embodiment, in the case where the pixel values of the difference data corresponding to the determination points Vh3 and Vh4 are larger than the threshold value, it is determined that the detection of the black mark 202 has succeeded. Consequently, at the time of the detection of the main scanning line Line 2, the pixel values of the difference data corresponding to the determination points Vh3 and Vh4 are larger than the threshold value, and therefore, it is determined that the detection of the black mark 202 has succeeded on the main scanning line.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to detect the home position of the sensor with a high accuracy without being affected by the temperature of the environment in which the image reading apparatus is installed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-115482, filed Jun. 9, 2016, which is hereby incorporated by reference wherein in its entirety.

What is claimed is:

1. An image reading apparatus having a reading portion, the apparatus comprising:
   at least one processor that operates as:
   an acquisition unit configured to acquire first data obtained by the reading portion reading a main scanning line in a state where a light source of the reading portion is turned on in a first light quantity, and second data obtained by the reading portion reading the main scanning line in a state where the light source of the reading portion is turned on in a second light quantity smaller than the first light quantity or in a state where the light source of the reading portion is turned off;
   a generation unit configured to generate difference data based on a difference of the first data and the second data; and
   a determination unit configured to determine whether a mark arranged at a position corresponding to a home position of the reading portion has been detected on the main scanning position based on the difference data,
   wherein the determination unit determines whether or not a pixel corresponding to a determination point indicating a predetermined position in a main scanning direction is a black pixel based on the difference data, and determines whether or not a pixel corresponding to a determination point different from the determination point is a white pixel based on the difference data, and
   wherein the determination unit determines that, in a case of determining that a pixel corresponding to a determination point indicating the predetermined position is a black pixel and a pixel corresponding to a determination point different from the determination point is a white pixel, the mark has been detected on the main scanning position.

2. The image reading apparatus according to claim 1, further comprising:
a display control unit configured to display error information in a case where it is determined that a number of times of determination processing by the determination unit exceeds a number corresponding to a number of lines across which the sensor can move.

3. The image reading apparatus according to claim 1, further comprising:
a printing control unit configured to perform printing based on print data.

4. An image reading method performed in an image reading apparatus having a reading portion, the method comprising:
acquiring first data obtained by the reading portion reading a main scanning line in a state where a light source of the reading portion is turned on in a first light quantity, and second data obtained by the reading portion reading the main scanning line in a state where the light source of the reading portion is turned on in a second light quantity smaller than the first light quantity or in a state where the light source of the reading portion is turned off;
generating difference data based on a difference of the first data and the second data; and
determining whether a mark arranged at a position corresponding to a home position of the reading portion has been detected on the main scanning position based on the difference data,
wherein the determining step determines whether or not a pixel corresponding to a determination point indicating a predetermined position in a main scanning direction is a black pixel based on the difference data, and determines whether or not a pixel corresponding to a determination point different from the determination point is a white pixel based on the difference data, and
wherein the determining step determines that, in a case of determining that a pixel corresponding to a determination point indicating the predetermined position is a black pixel and a pixel corresponding to a determination point different from the determination point is a white pixel, the mark has been detected on the main scanning position.

5. The image reading method according to claim 4, wherein
error information is displayed in a case where it is determined that a number of times of the determination processing exceeds a number corresponding to a number of lines across which the sensor can move.

6. The image reading method according to claim 4, wherein
printing is performed based on print data.

7. An image reading apparatus having a reading portion, the apparatus comprising:
at least one processor that operates as:
an acquisition unit configured to acquire first data obtained by the reading portion reading a first main scanning line, and second data obtained by the reading portion reading a second main scanning line different from the first main scanning line;
a generation unit configured to generate difference data corresponding to main scanning positions based on a difference between the first data and the second data; and
a determination unit configured to determine whether a mark arranged at a position corresponding to a home position of the reading portion has been detected on the main scanning position based on the difference data,
wherein the determination unit determines whether or not a pixel corresponding to a determination point indicating a predetermined position in a main scanning direction is a black pixel based on the difference data, and determines whether or not a pixel corresponding to a determination point different from the determination point in the main scanning direction is a white pixel based on the difference data, and
wherein the determination unit determines that, in a case of determining that a pixel corresponding to a determination point indicating the predetermined position is a black pixel and a pixel corresponding to a determination point different from the determination point is a white pixel, the mark has been detected on the main scanning position.

8. The image reading apparatus according to claim 7, wherein the difference data includes pixel values.

9. The image reading apparatus according to claim 7, further comprising:
a printing control unit configured to perform printing based on print data.

10. The image reading apparatus according to claim 7, wherein the second main scanning line corresponds to a next line of the first main scanning line.

11. The image reading apparatus according to claim 7, wherein the reading portion comprises a contact image sensor.

* * * * *